US009979225B2

(12) United States Patent
Bernhard

(10) Patent No.: US 9,979,225 B2
(45) Date of Patent: May 22, 2018

(54) ENERGY GENERATION SYSTEM FOR WEARABLE COMMUNICATION DEVICE

(71) Applicant: Christophe & Albrecht, Inc., Miami Beach, FL (US)

(72) Inventor: Aleksandr Bernhard, Miami Beach, FL (US)

(73) Assignee: Christophe & Albrecht, Inc., Miami Beach, FL (US)

(*) Notice: Subject to any disclaimer, the term of this patent is extended or adjusted under 35 U.S.C. 154(b) by 498 days.

(21) Appl. No.: 14/811,169

(22) Filed: Jul. 28, 2015

(65) Prior Publication Data

US 2016/0028264 A1 Jan. 28, 2016

Related U.S. Application Data

(60) Provisional application No. 62/029,974, filed on Jul. 28, 2014.

(51) Int. Cl.
| H02J 7/34 | (2006.01) |
| G04C 10/00 | (2006.01) |
| H02J 1/10 | (2006.01) |
| G04C 10/04 | (2006.01) |
| G04G 21/04 | (2013.01) |
| H02J 7/32 | (2006.01) |

(52) U.S. Cl.
CPC ............. *H02J 7/345* (2013.01); *G04C 10/00* (2013.01); *G04C 10/04* (2013.01); *G04G 21/04* (2013.01); *H02J 1/10* (2013.01); *H02J 7/32* (2013.01); *Y02B 40/90* (2013.01)

(58) Field of Classification Search
CPC .......... G04G 21/04; G04C 10/00; H02J 7/345
See application file for complete search history.

(56) References Cited

U.S. PATENT DOCUMENTS 2,928,231 A 3/1960 Murrle
3,412,550 A 11/1968 Delessert et al.
(Continued)

OTHER PUBLICATIONS

Truffol, *Introducing the Time Juice*, (2015) http://truffol.com/time-juice-apple-watch-mechanical-charger.

*Primary Examiner* — Thienvu Tran
*Assistant Examiner* — Pinping Sun
(74) *Attorney, Agent, or Firm* — Dorsey & Whitney LLP

(57) ABSTRACT

Wearable electronic devices and methods for powering wearable electronic devices are provided. A wearable electronic device includes a communication transponder, a processor, at least one storage unit and a kinetic energy system. The communication transponder wirelessly communicates with a further electronic device over a communication channel. The processor controls the communication transponder such that information is passed between the wearable electronic device and the further electronic device according to a predetermined operation mode involving interaction of the wearable and further electronic devices. The kinetic energy system converts kinetic energy collected from motion of the wearable electronic device to electrical energy, and distributes the electrical energy among the at least one energy storage unit and one or more other electrical components of the wearable electronic device based on a charge state of the at least one energy storage unit and the predetermined operation mode of the wearable electronic device.

20 Claims, 12 Drawing Sheets

(56) References Cited

U.S. PATENT DOCUMENTS

| | | | |
|---|---|---|---|
| 4,644,246 A | 2/1987 | Knapen | |
| 5,119,348 A | 6/1992 | Mathys | |
| 5,923,619 A | 7/1999 | Knapen et al. | |
| 6,244,742 B1 | 6/2001 | Yamada et al. | |
| 7,495,558 B2 * | 2/2009 | Pope | G01K 1/024 |
| | | | 340/572.1 |
| 9,864,882 B1 * | 1/2018 | Geist | G06K 7/10158 |
| 2011/0022025 A1 * | 1/2011 | Savoie | A61M 5/14248 |
| | | | 604/500 |
| 2012/0068827 A1 * | 3/2012 | Yi | G01D 5/18 |
| | | | 340/10.1 |
| 2012/0136534 A1 * | 5/2012 | Walsh | B60L 8/00 |
| | | | 701/36 |
| 2013/0044215 A1 | 2/2013 | Rothkopf et al. | |
| 2015/0188389 A1 * | 7/2015 | Wan | F03G 7/08 |
| | | | 290/1 A |

* cited by examiner

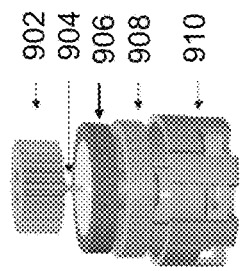
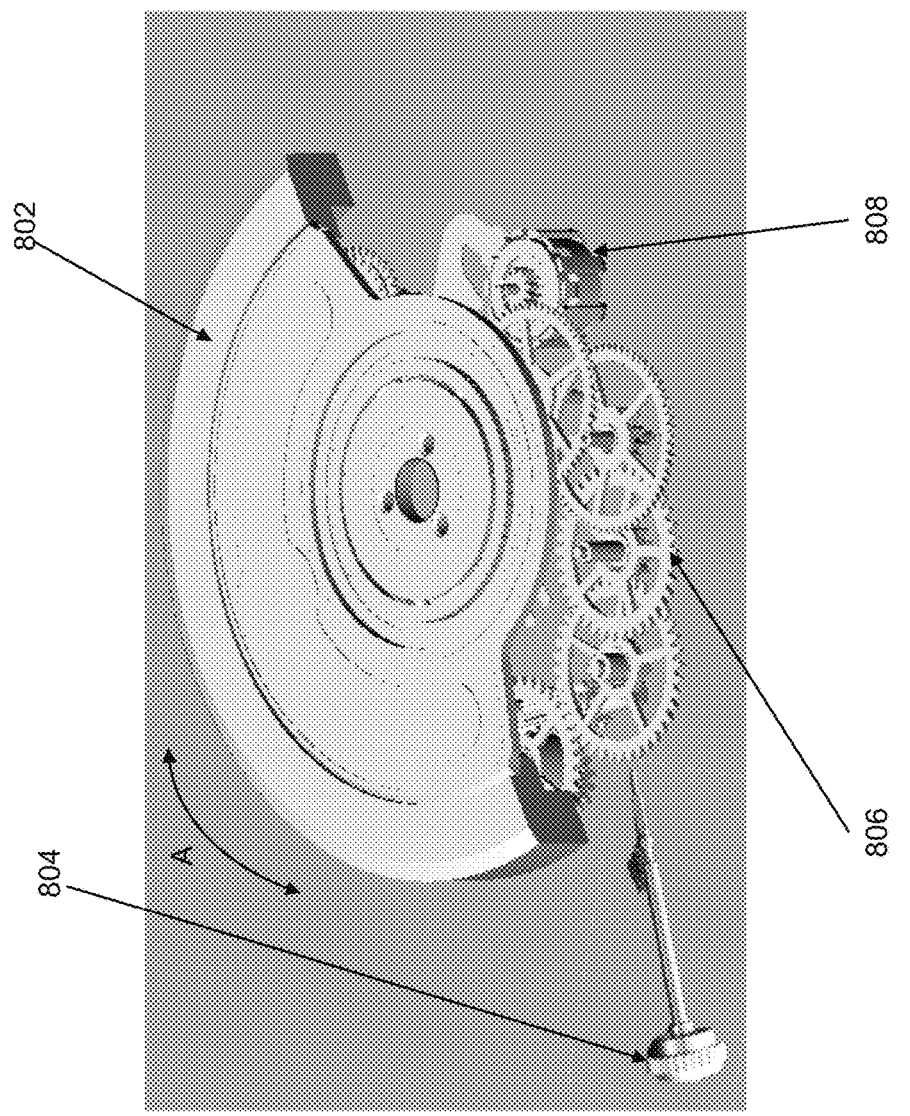
FIG. 9B
FIG. 9A

US 9,979,225 B2

ENERGY GENERATION SYSTEM FOR WEARABLE COMMUNICATION DEVICE

CROSS-REFERENCE TO RELATED APPLICATIONS

The present application claims the benefit of U.S. Provisional Application No. 62/029,974, filed Jul. 28, 2014, which is hereby incorporated by reference in its entirety.

TECHNICAL FIELD

The present disclosure relates generally to wearable electronic devices and, in particular, kinetic energy systems and methods for powering wearable electronic devices including wearable communication devices.

BACKGROUND

Currently, wrist-worn wearable devices may be equipped with onboard electronics and re-charged via a physical wired connection. The hardware in these devices may be permanently mounted and may be generally difficult to upgrade and/or replace. Some wearable devices have attempted to provide multiple functions to a user. However, these devices may be limited by power requirements, processing requirements, battery life, the inconvenience of frequently re-charging by physically connecting the device to a power source and/or rapid obsolescence due to the permanency of the hardware.

SUMMARY

Aspects of the present disclosure relate to wearable electronic devices. A wearable device includes a communication transponder, a processor, at least one energy storage unit and a kinetic energy system. The communication transponder is configured to wirelessly communicate with a further electronic device over a communication channel. The processor is electrically coupled to a non-transitory memory and executes computer-readable instructions stored in the non-transitory memory. The processor is configured to control the communication transponder such that information is passed between the wearable electronic device and the further electronic device over the communication channel according to a predetermined operation mode. The predetermined operation mode involves interaction of the wearable electronic device and the further electronic device. The kinetic energy system is electrically coupled to the at least one energy storage unit. The kinetic energy system is configured to convert kinetic energy collected from motion of the wearable electronic device to electrical energy and distribute the electrical energy among the at least one energy storage unit and one or more other electrical components of the wearable electronic device based on a charge state of the at least one energy storage unit and the predetermined operation mode of the wearable electronic device.

Aspects of the present disclosure also relate to methods of powering wearable electronic devices. A wearable device is operated, by a processor, in a predetermined operation mode that involves interaction of the wearable electronic device and a further electronic device. During the predetermined operation mode, information is passed between the wearable electronic device and the further electronic device according to the predetermined operation mode, via a communication transponder configured to wirelessly communicate with the further electronic device over a communication channel. The processor executes computer-readable instructions stored in a non-transitory memory. A kinetic energy system converts kinetic energy collected from motion of the wearable device to electrical energy; detects a charge state of at least one energy storage unit of the wearable electronic device; and distributes the electrical energy among the at least one energy storage unit and one or more other electrical components of the wearable electronic device based on the detected charge state of the at least one energy storage unit and the predetermined operation mode of the wearable electronic device.

BRIEF DESCRIPTION OF DRAWINGS

FIG. 9A is an exploded perspective view diagram of a portion of the kinetic energy system shown in FIG. 8, according to an aspect of the present disclosure.

FIG. 9B is an exploded perspective view diagram of a generator of the kinetic energy system shown in FIG. 9A, according to an aspect of the present disclosure

DETAILED DESCRIPTION

Figure 1:
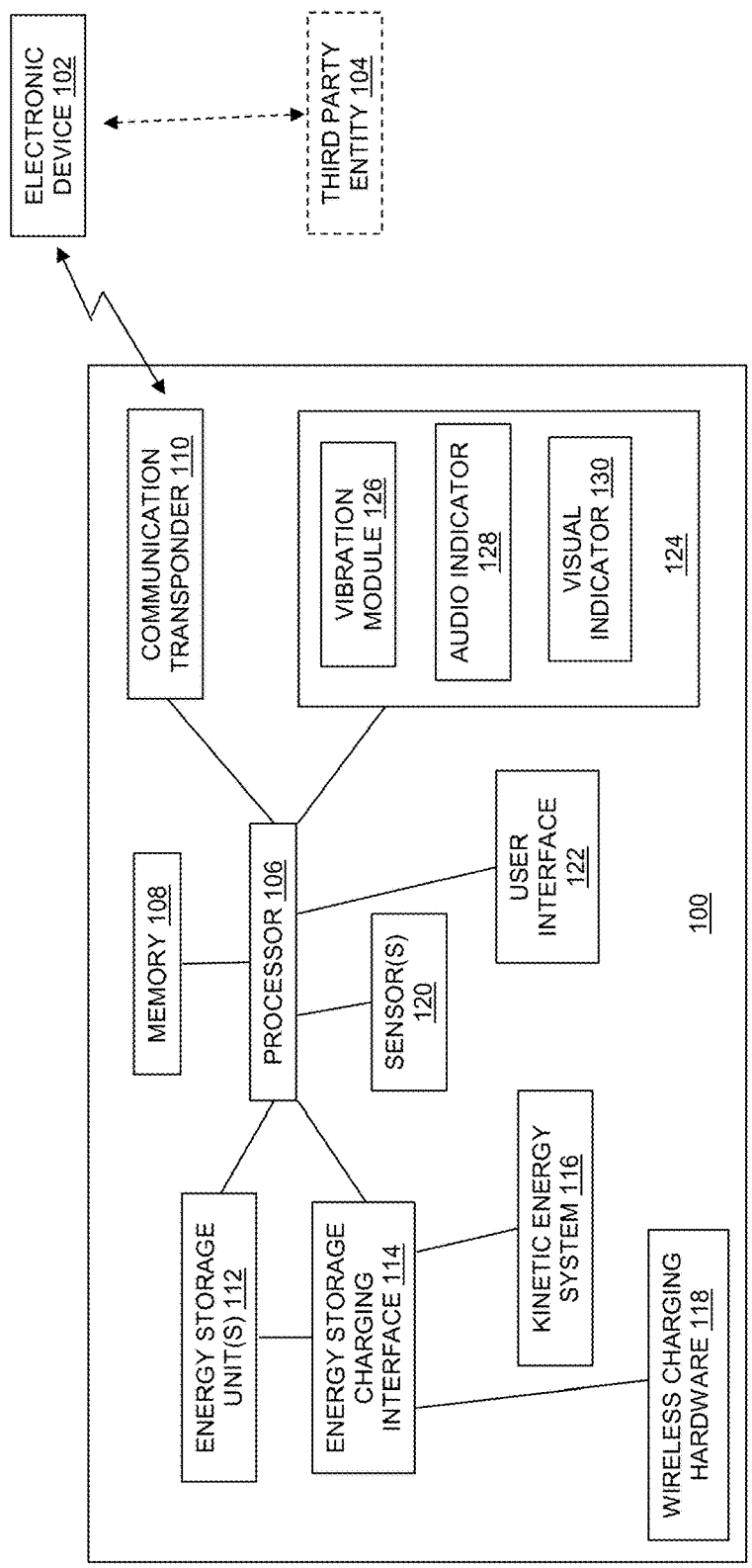
FIG. 1 is a functional block diagram of an example wearable electronic device, according to an aspect of the present disclosure.

Generally described, aspects of the present disclosure relate to wearable electronic devices. In particular, the present disclosure is directed to wearable devices (e.g., wrist worn wearable devices) that can be configured to interact with associated devices to perform one or more functions and operations. In one aspect, the wearable devices may be fully upgradable by way of upgrading firmware and swapping out hardware components. In another aspect, at least one energy storage unit (e.g., a battery) of the wearable device may be re-charged by a kinetic energy generator or via wireless energy transmission. In still another aspect, onboard sensors and devices may interact with a central processor. The central processor may control a communication transponder to send and/or receive one or more communications to/from one or more connected devices wirelessly via various communication standards (e.g., Bluetooth, GPS, Cellular, Near Field Communication (NFC), IEEE 802.11x standards, etc.). In yet another aspect, a wearable electronic device may be configured to interact with a connected device (or with a third party entity via the connected device) according to various operation modes. The various operation modes may include, for example, identity verification, contactless payment, SOS emergency response, digital wallet transactions, secure access, automated event and venue access, interaction with automation systems, biometric tracking (e.g., personal health/fitness tracking), and generally the control of any compatible connected device.

Aspects of the present disclosure may include wearable electronic devices and methods for powering wearable electronic devices using a kinetic energy system. An example wearable electronic device may include at least one communication transponder, a processor, at least one energy storage unit and a kinetic energy system. The communication transponder(s) may be configured to wirelessly communicate with a further electronic device (also referred to herein as a connected electronic device) over a communication channel. The processor may be configured to control the communication transponder(s) such that information is passed between the wearable electronic device and the further electronic device over the communication channel according to a predetermined operation mode. The predetermined operation mode may involve interaction of the wearable electronic device and the further electronic device. The kinetic energy system may be configured to convert kinetic energy collected from motion of the wearable electronic device to electrical energy. For example, the kinetic energy system may include an oscillating mass for converting motion to kinetic energy and an electromagnetic generator to convert the kinetic energy to electrical energy. The kinetic energy system may be configured to distribute the electrical energy (converted from the kinetic energy) among the at least one energy storage unit and one or more other electrical components of the wearable device, based on a charge state of the at least one storage unit and the predetermined operation mode of the wearable electronic device.

In some examples, the energy storage unit may include at least one primary energy storage unit (e.g., a battery) and at least one secondary energy storage unit (e.g., a capacitor or a supercapacitor). In some examples, the kinetic energy system may also determine a current operating state of the wearable electronic device (e.g., a standby mode or a communication mode) and distribute the electrical energy among the energy storage unit(s) and the electrical component(s) based on the current operating state. In some examples, the kinetic energy system may detect the current charge state of each energy storage unit, to distribute the electrical energy according to each detected current charge state and/or to deactivate collection of the electrical energy from the converted kinetic energy.

FIG. 1 is a functional block diagram illustrating an example wearable electronic device 100 (also referred to herein as wearable device 100) according to an embodiment of the present disclosure. Illustratively, wearable device 100 may include processor 106, memory 108, communication transponder 110, at least one energy storage unit 112, energy charging interface 114, kinetic energy system 116, at least one sensor 120, user interface 122 and one or more output indicators 124. In some examples, wearable device 100 may include wireless charging hardware 118. Components of wearable device 100 may communicate with each other via a communication and data bus (not shown).

Processor 106 may be configured to control one or more components of wearable device 100 (i.e., memory 108, communication transponder 110, energy storage unit(s) 112, energy storage charging interface 114, kinetic energy system 116, wireless charging hardware 118, sensor(s) 120, user interface 122 and/or output indicator(s) 124). Processor 106 may include, without being limited to, a microprocessor, a central processing unit, an application specific integrated circuit (ASIC), a field programmable gate array (FPGA) and/or a digital signal processor (DSP). Processor 106 may be configured to execute processing logic for performing the operations described herein. In general, processor 106 may include any suitable special-purpose processing device or a general-purpose processing device specially programmed with processing logic to perform the operations described herein.

Processor 106 may be configured to execute processing logic to control components of wearable device 100 to perform one or more predetermined operation modes. A predetermined operation mode may include interaction of wearable device 100 with at least one connected electronic device 102 (or third party entity 104 via connected electronic device 102). Examples of predetermined operation modes are described further below with respect to FIGS. 2-7.

Memory 108 may include, for example, without being limited to, at least one of a read-only memory (ROM), a random access memory (RAM), a flash memory, a dynamic RAM (DRAM) and a static RAM (SRAM), storing computer-readable instructions (i.e., programming logic) executable by processor 106. In general, memory 108 may include any suitable non-transitory computer readable storage medium storing computer-readable instructions executable by processor 106 for performing the operations described herein. Although one memory 108 is illustrated in FIG. 1, in some examples, wearable device 100 may include two or more memory devices (e.g., dynamic memory and static memory).

In some examples, memory 108 may include a data storage device storing instructions (e.g., software) for performing any one or more of the functions described herein (including the predetermined operation modes as described herein). The data storage device may include any suitable non-transitory computer-readable storage medium, including, without being limited to, solid-state memories, optical media and magnetic media.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine (i.e., device 1000 and that causes the machine to perform any one or more of the methodologies of the present disclosure.

In some examples, wearable device 100 may store (e.g., in memory 108, a database, a data storage device, a secure access device such as a subscriber identity module (SIM)), for example, identification information of wearable device 100 (e.g., a device identification number, a hardware identification information, software identification information, etc.) and/or user information (e.g., user identity information, password(s), user access permission(s), etc.) of one or more users of wearable device 100. In some examples, wearable device 100 may store (e.g., in memory 108, a database, a data storage device) predetermined energy specifications for the components of wearable device 100. The predetermined energy specifications may be used by kinetic energy system 100 for distribution of energy to component(s) of wearable device 100 (described further below).

Communication transponder 110 may be configured to wirelessly communicate with electronic device 102 (connected) via a wireless communication channel. (Electronic device 102 is also referred to as connected electronic device 102.) Communication transponder 110 may be configured to wirelessly communicate with electronic device 102 via any suitable wireless communication standard, such as, without being limited to, Bluetooth, GPS, Cellular, NFC and/or IEEE 802.11x standards. Communication transponder 110 may be controlled by processor 106 to interact with connected electronic device 102 such that information is passed between wearable device 100 and connected electronic device 102 over the communication channel according to a predetermined operation mode.

Although one communication transponder 110 is illustrated in FIG. 1, in some examples, wearable device 100 may include two or more communication transponders 110 (e.g., for NFC communication and for cellular communication). In some examples, one or more communication transponders 110 may also be configured for wired communication with electronic device 102. Although one electronic device 102 is illustrated in FIG. 1, in some examples, wearable device 100 may communicate with two or more electronic devices 102.

Connected electronic device(s) 102 may include any compatible electronic device that can communicate wirelessly and interact with wearable device 100. Examples of electronic device 102 may include, without being limited to, mobile phones, tablet computers, personal computers (e.g., desktop computers or laptop computers), payment terminals, access terminals, home security systems, vehicle security systems and building security systems. In some examples, connected electronic devices 102 may in turn interact with one or more third party entities 104 (e.g., hardware, software, or databases), such as banking systems, ticketing systems, access control databases, identity verification systems, mainframe terminals, cloud based databases and systems and emergency response networks. In some examples, electronic device(s) 102 and third party entity(s) 104 may be linked to one another via one or more networks (not shown), including private and/or public networks.

Figure 10:
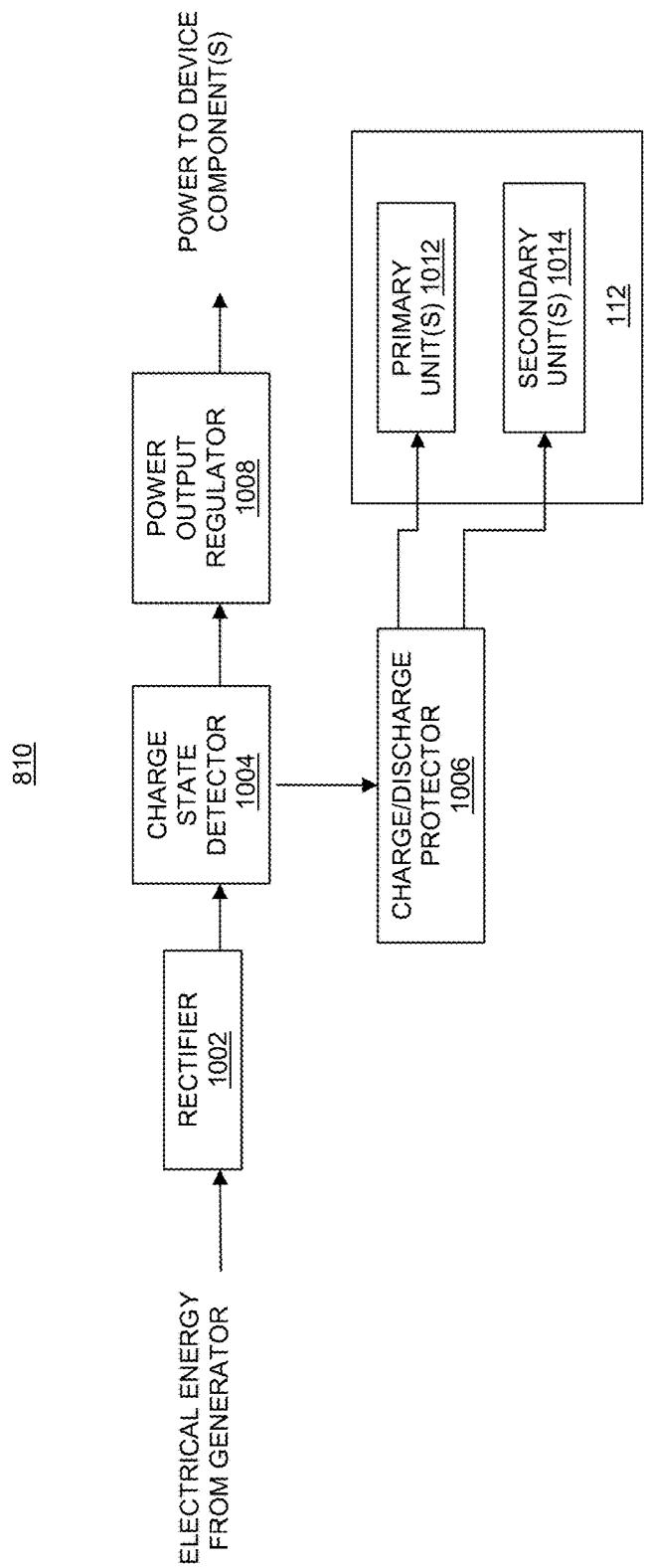
FIG. 10 is a functional block diagram of an example power management unit of the kinetic energy system shown in FIG. 8, according to an aspect of the present disclosure.

Energy storage unit(s) 112 may include any suitable device (e.g., a battery, a capacitor or a supercapacitor) for storing electrical energy for use by one or more components of wearable device 100. In some examples, energy storage unit 112 may include at least one primary storage unit 1012 (e.g., a battery) and at least one secondary storage unit 1014 (e.g., a capacitor and/or supercapacitor), as shown in FIG. 10. Energy storage unit(s) 112 may receive electrical energy from kinetic energy system 116 and wireless charging hardware 118, for example, via energy storage charging interface 114. Any suitable type of battery may be used as energy storage unit 112, including, without being limited to lithium polymer batteries and carbon graphite batteries. In some examples, supercapacitors and carbon graphite batteries may be used for energy storage units 112. For example, supercapacitors and carbon graphite batteries may be less sensitive to charging cycles compared to lithium polymer batteries and capacitors.

Energy storage charging interface 114 may include any suitable interface configured to receive electrical energy from kinetic energy system 116 (and, in some examples, from wireless charging hardware 118) and transfer the received electrical energy to energy storage unit(s) 112. In some examples, energy storage charging interface 114 may communicate with kinetic energy system 116 to transfer electrical energy from among energy storage unit(s) 112 to one or more components of wearable device 100 (i.e., component(s) other than energy storage unit(s) 112 that may be used for an operation mode). In some examples, energy storage charging interface 114 may communicate with kinetic energy system 116 to distribute electrical energy among each energy storage unit 112 based on a current charge state of each energy storage unit 112.

Kinetic energy system 116 may be configured to convert kinetic energy collected from motion of wearable device 100 to electrical energy, detect a charge state of energy storage unit(s) 112 and distribute the (collected) electrical energy among energy storage unit(s) 112 and one or more components of wearable device 100, based on the detected charge state and a predetermined operation mode of wearable device 100. Kinetic energy system 116 is described further below with respect to FIGS. 8-12.

In some examples, wearable device 100 may include wireless charging hardware 118. Wireless charging hardware 118 may include any suitable hardware (as well as any software components) to wirelessly receive an energy transmission from a power source (i.e., without using solid conductors).

Sensor(s) 120 may include one or more sensors for capturing user information from a user of wearable device 100. The captured user information may be used to perform one or more predetermined operation modes. Sensor(s) 120 may include, without being limited to, biometric sensors (e.g., a fingerprint sensor, a heart rate sensor), motion sensors (e.g., an accelerometer, a gyroscope) and/or voice sensors (e.g., a microphone).

In some examples, wearable device 100 may include user interface 122 for receiving one or more indications from a user of wearable device 100. User interface 122 may include, for example, one or more buttons (e.g., a push button, a touch-sensitive button), an alphanumeric input device, a cursor control device and/or a display. The user indications may, for example, be used to perform one or more predetermined operation modes.

In some examples, wearable device 100 may include one or more output indicator(s) 124. Output indicator(s) 124 may, for example, be used to indicate prompts for user input and/or various information during one or more predetermined operation modes. Output indicator(s) 124 may include, without being limited to, vibration module 126, audio indicator 128 (e.g., a buzzer and/or an audio speaker) and/or at least one visual indicator 130 (e.g., one or more indicator lights, a display).

Wearable device 100 may include any suitable hardware and/or software components for performing the functions described herein.

Figure 2:
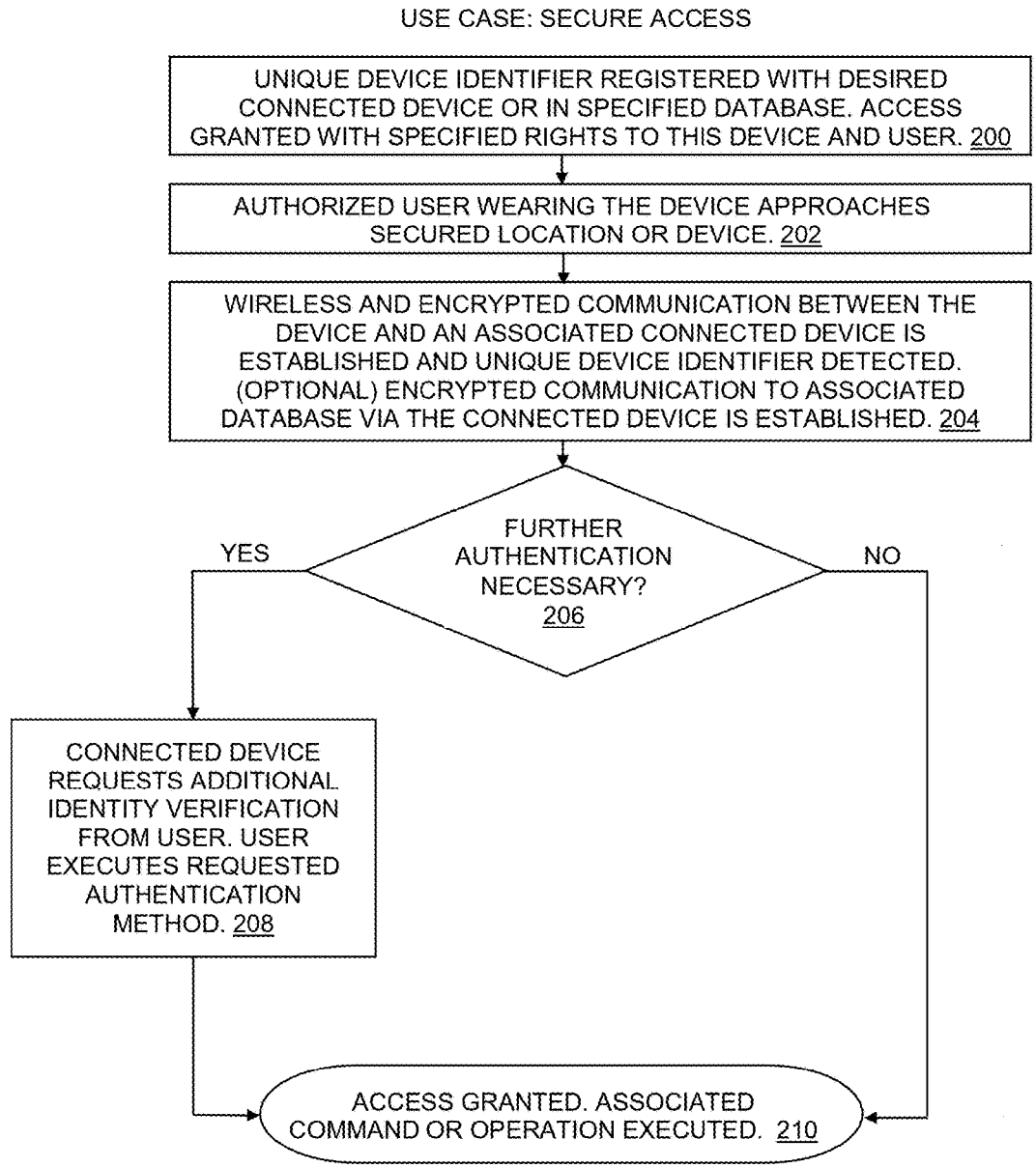
FIG. 2 is a flowchart diagram of an example method of operating the wearable device shown in FIG. 1 for secure access to a location or a device, according to an aspect of the present disclosure.

FIG. 2 is a flowchart diagram illustrating an example method of operating wearable device 100 for secure access to a location or device (e.g., connected electronic device 102). In some cases, the wearable device user may be granted access to a venue, vehicle, or event, where wearable device 100 may be used as an electronic credential or digital key. A unique identifier attributed to wearable device 100 may be registered locally or remotely, such as with desired connected electronic device 102 or a specified database (step 200). Access to a device/location may be granted depending upon specified rights to wearable device 100 and/or a user of wearable device 100.

An authorized user wearing wearable device 100 may approach a secured location or device (e.g., electronic device 102) (step 202). Upon establishing secure and encrypted communication with desired connected device 102, verification of wearable device 100 may take place locally and/or remotely (step 204). For example, the unique identifier of wearable device 100 and/or the wearable device user may be detected and confirmed by electronic device 102. In some examples, encrypted communication to an associated database may be established via connected electronic device 102. In some cases, user authentication may be requested (step 206). When user authentication is requested, step 206 proceeds to step 208, and connected device 102 requests additional identify verification from the wearable device user (e.g., biometric, voice, and/or gesture authentication). The requested authentication method is then executed (step 208). This supplementary authentication may take place either locally on wearable device 100, remotely on connected electronic device 102, remotely on the associated database, or a combination thereof. Once the user is authenticated (step 208) and access authorization is verified (step 204), the user may be granted access and any associated operation may be executed by connected device 102 (step 210). Example uses of this predetermined operation mode may include, without being limited to, a digital key for access to an automobile, a yacht, an aircraft, a residence, a hotel, a club, a venue, and/or an event.

Figure 3:
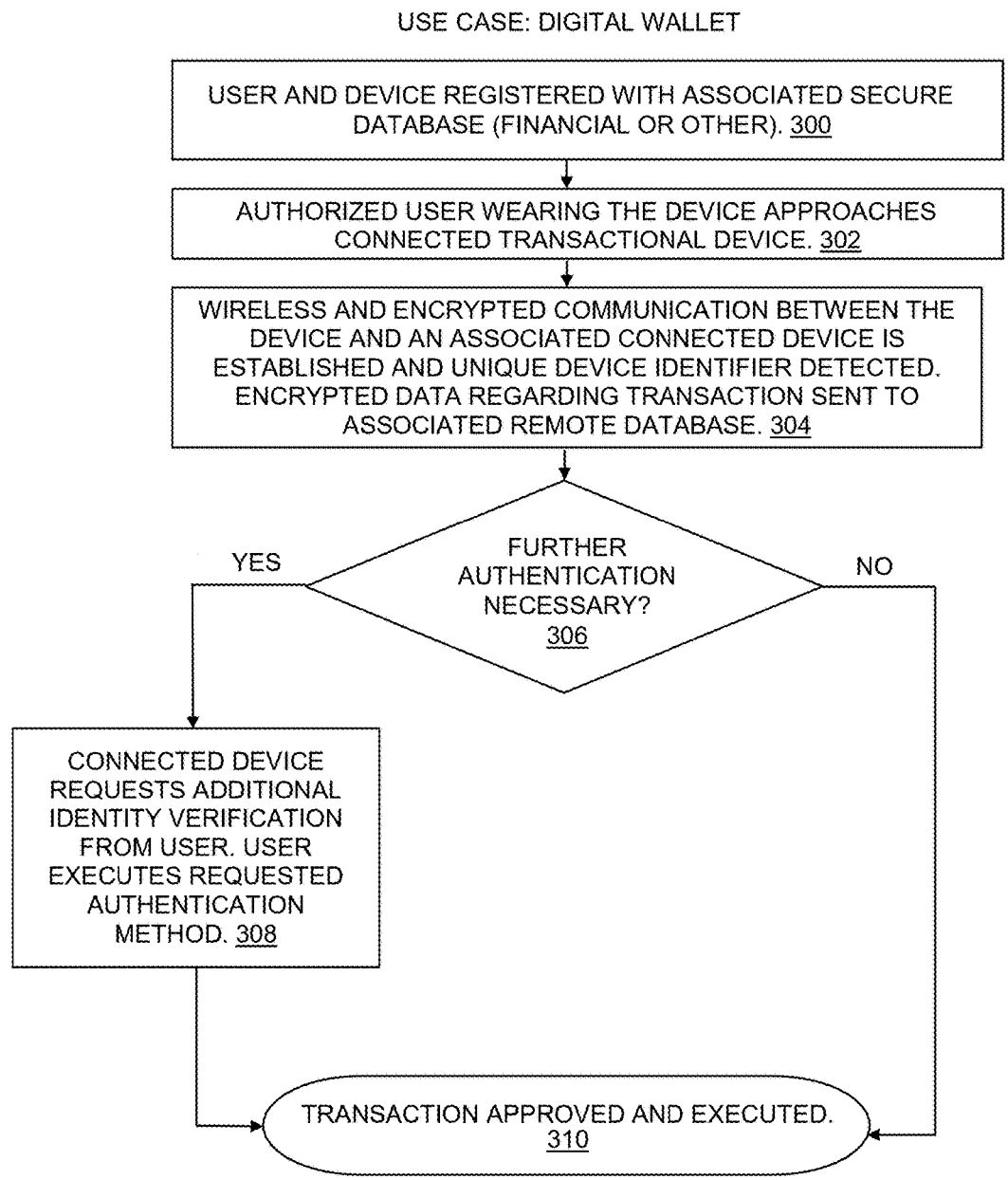
FIG. 3 is a flowchart diagram of an example method of operating the wearable device shown in FIG. 1 for digital wallet transactions, according to an aspect of the present disclosure.

FIG. 3 is a flowchart diagram illustrating an example method of operating wearable device 100 for digital wallet related transactions. The electronics embedded in wearable device 100 may allow for financial transactions to take place with any currency (including crypto-currencies). Wearable device 100 may also serve as a membership identification tool for use in loyalty clubs or members clubs. Financial and membership information may be stored on wearable device 100 and/or on a remote database linked with wearable device 100.

The wearable device user and wearable device 100 may be registered with a secure database (e.g., a financial database or other suitable database) (step 300). An authorized user wearing wearable device 100 may approach a transaction device (e.g., electronic device 102) (step 302). Upon establishing secure and encrypted communication with transactional device 102, the unique device identifier of wearable device 100 may be detected and confirmed by electronic device 102 (step 304). In some examples, encrypted data regarding a transaction may be sent to an associated remote database. In some cases, user authentication may be requested (step 306). When user authentication is requested, step 306 proceeds to step 308, and connected device 102 requests additional identify verification from the wearable device user (e.g., biometric, voice, and/or gesture authentication). The requested authentication method is then executed (step 308). Once the user is authenticated (step 308) and the unique device identifier is verified (step 304), the transaction is approved and executed by connected device 102 (and/or by a combination of connected device 102 and one or more third party entities 104) (step 310).

With certain transactions, a method of biometric identification may be used to verify the user's identity. Additional examples of this operation mode may include use as a primary identification device (e.g., passport, driver's license, personal identification) with one or more forms of user authentication via biometric methods (e.g., fingerprint or voice authentication).

Figure 4:
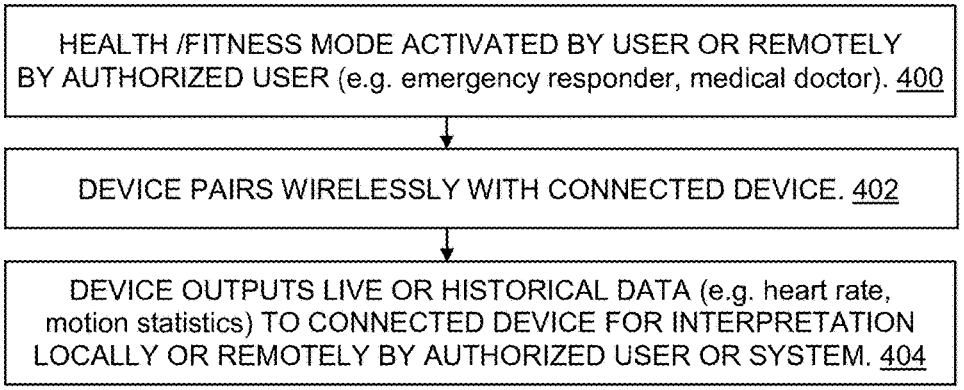
FIG. 4 is a flowchart diagram of an example method of operating the wearable device shown in FIG. 1 for biometric tracking, according to an aspect of the present disclosure.

FIG. 4 is a flowchart diagram illustrating an example method of operating wearable device 100 for biometric tracking, such as health-related biometrics. Biometric and movement sensors 120 in wearable device 100 may be used to monitor health and vital signals for fitness and/or medical purposes. Use cases include, without being limited to, tracking of specific biometric variables to monitor medical conditions, tracking of body movements for fitness training, and real time monitoring of vital signs for live communication with a medical professional in both emergency and non-emergency situations.

A health and/or fitness mode may be activated by a user of wearable device 100 (e.g., via user interface 122) or remotely by an authorized user (e.g., an emergency responder, a medical doctor) (step 400). Wearable device 100 may wirelessly connect to electronic device 102 (step 402). Wearable device 100 may transmit live and/or historical data (e.g., heart rate, motion statistics) to connected electronic device 102 for interpretation locally or remotely by an authorized user or system (step 404).

Figure 5:
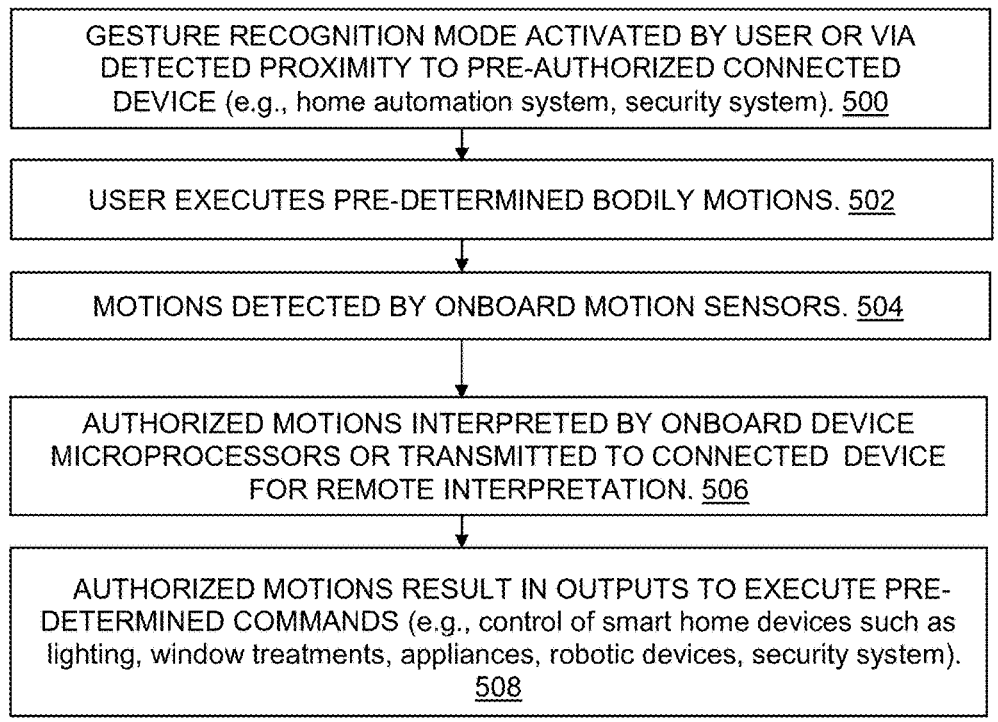
FIG. 5 is a flowchart diagram of an example method of operating the wearable device shown in FIG. 1 for gesture-initiated operations, according to an aspect of the present disclosure.

FIG. 5 is a flowchart diagram illustrating an example method of operating wearable device 100 for gesture-initiated operations. Among other functions, motion sensor(s) 120 on wearable device 100 may be used to process user commands via preset physical gestures by the user's arm. A gesture recognition mode may be activated by a wearable device user or via a detected proximity to a pre-authorized connected device (e.g., a home automation system, a security system) (step 500). When in gesture recognition mode, a given gesture or combination of gestures is performed by the user (step 502). The motion(s) is detected by motion sensor(s) 120 on wearable device 100 (step 504). Detected motion(s) may be interpreted by processor 106 of wearable device 100 or transmitted to connected device 102 for remote interpretation (step 506). Authorized motion(s) may result in the output of one or more predetermined commands to connected device 102 which in turn may cause connected device 102 to perform a specific operation (step 508). Examples operations include, without being limited to, control of smart home devices such as lighting, window treatments, appliances, robotic devices, security systems. Connected devices 102 may include any compatible electronic device or system (e.g., a building, a home, a venue, a vehicle, a yacht, an aircraft, etc.). Gesture recognition may serve as an alternative or additional user authentication method.

Figure 6:
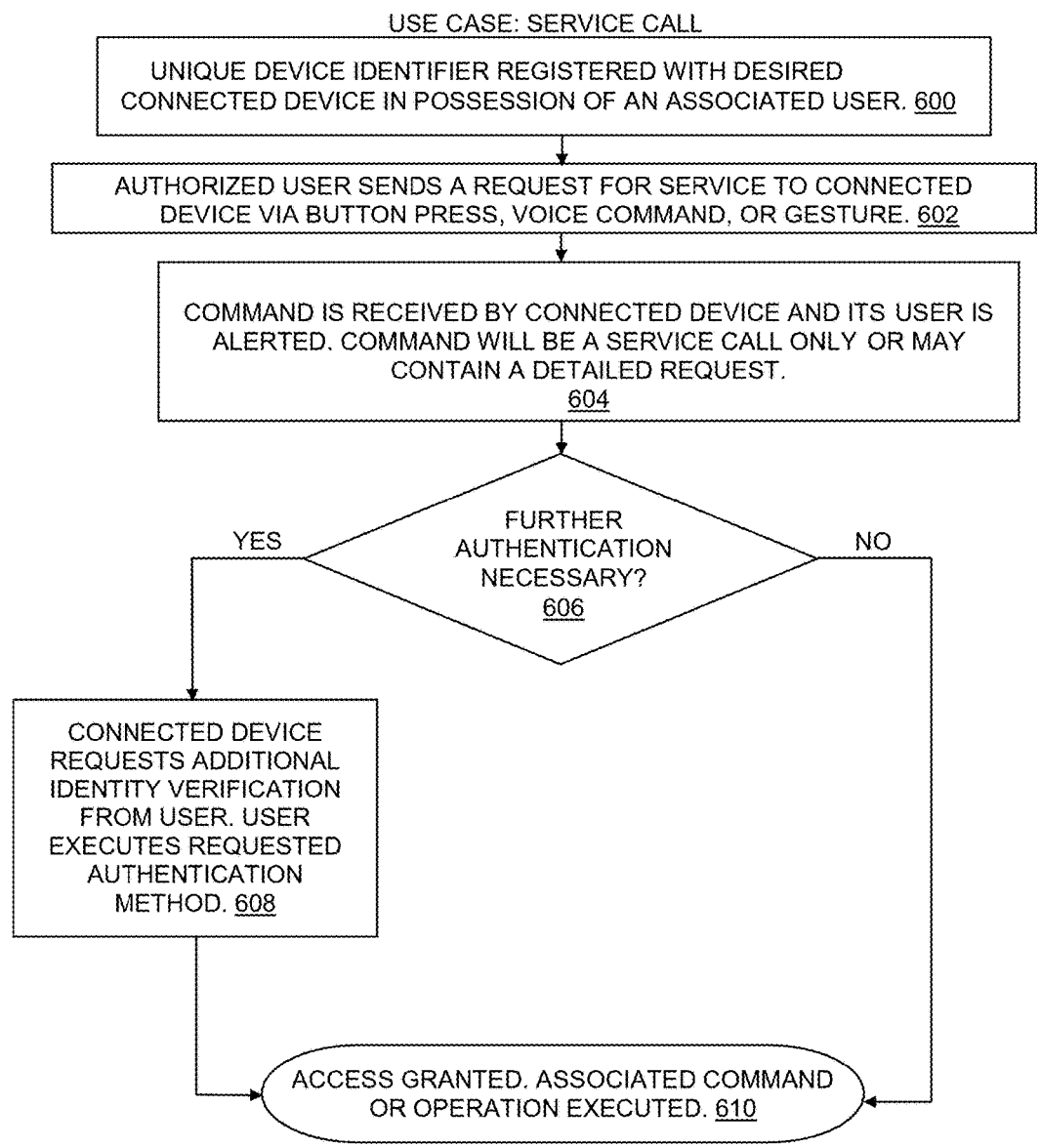
FIG. 6 is a flowchart diagram of an example method of operating the wearable device shown in FIG. 1 for communicating with another party, according to an aspect of the present disclosure.

FIG. 6 is a flowchart diagram illustrating a method of operating wearable device 100 for communicating with another party. In some examples, wearable device 100 may be configured to summon a separate (other) user in possession of connected electronic device 102. A user of wearable device 100 may, either by a voice command (e.g., via sensor 120), a button press (e.g., via user interface 122), or a combination thereof, have the ability to communicate with the other user of connected device 102. For example, wearable device 100 may communicate with the other user of connected device 102 via on-board communication hardware and/or software or via an intermediary connected device (e.g., a mobile phone, a tablet computer, or another communication device). Example uses for this operation mode may include, without being limited to, summoning of a personal assistant, a family member, staff at a venue, or any individual or group of individuals suitable for completion of a desired task.

A unique device identifier of wearable device 100 may be registered with a desired connected device 102 in the possession of an associated (i.e., other) user (step 600). An authorized user wearing wearable device 100 may send a request for service to connected device 102 using wearable device 100 (e.g., via a button press, a voice command and/or a gesture) (step 602). A command (e.g., a service call and/or a detailed request) may be received by connected device 102, and the other user of connected device 102 may be alerted (step 604). In some cases, user authentication may be requested (step 606). When user authentication is requested, step 606 proceeds to step 608, and connected device 102 may request additional identify verification from the wearable device user (e.g., biometric, voice, and/or gesture authentication). The requested authentication method is then executed (step 608). Once the user is authenticated (step 608) and the connected device 102 receives the command (step 604), access may be granted, and an associated command or operation may be executed (step 610).

Figure 7:
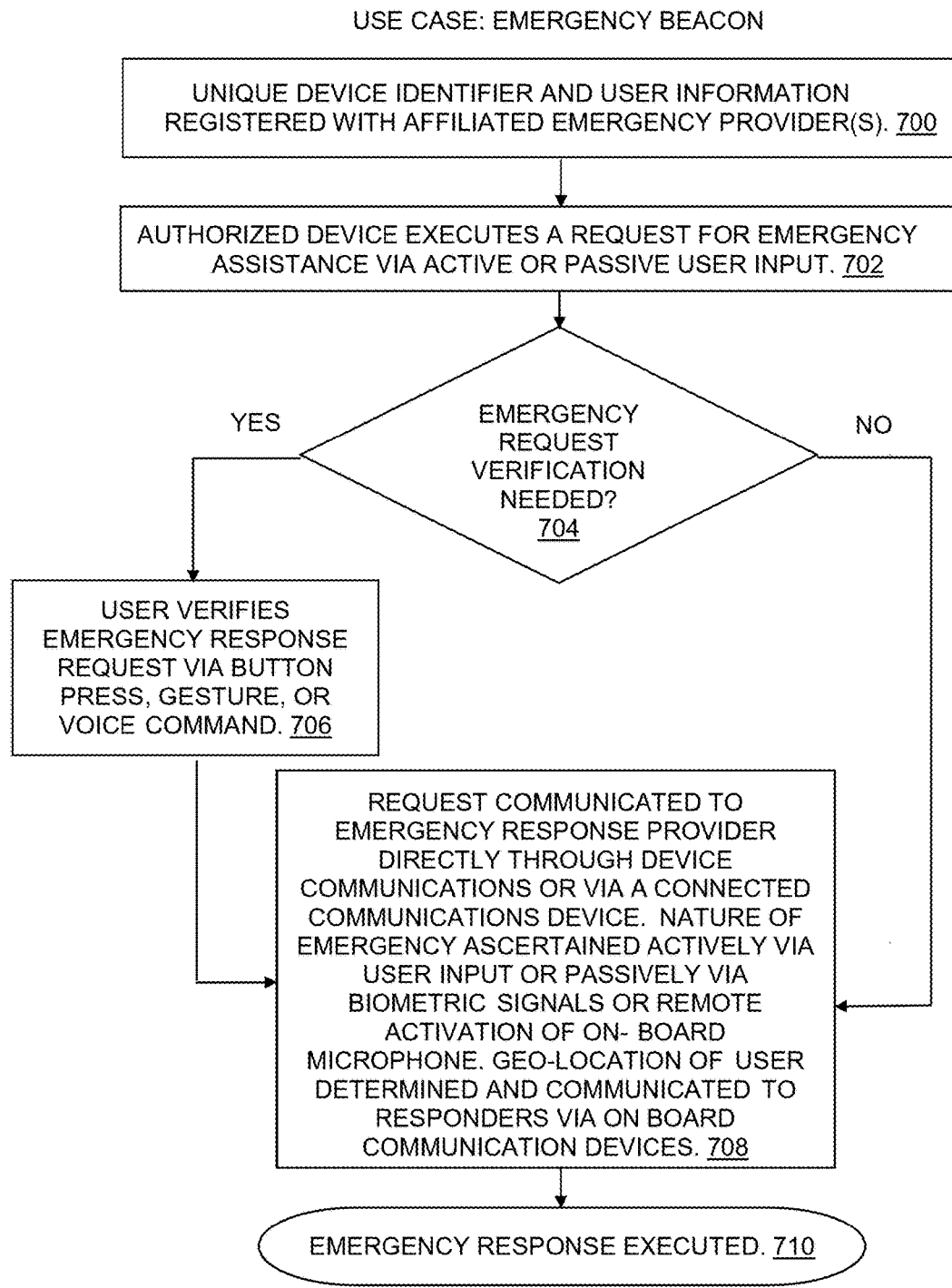
FIG. 7 is a flowchart diagram of an example method of operating the wearable device shown in FIG. 1 for emergency communications, according to an aspect of the present disclosure.

FIG. 7 is a flowchart diagram illustrating an example method of operating wearable device 100 for emergency communications. Using integrated communication hardware (and/or software) of wearable device 100, e.g., both short-range and long-range communication, wearable device 100 may serve as an emergency beacon, either directly through use of its own onboard communication devices (e.g., communication transponder(s) 110) or via an intermediary communications device. Activation of such an emergency response sequence may be initiated, for example, via an active input from the user of wearable device 100 (such as a button press, a voice command, gesture control, or a combination thereof), a passive input (such as input from a biometric sensor) or a combination of both active and passive inputs. In addition to the capability of wearable device 100 to send an SOS signal or biometric information to a connected party, onboard hardware and/or software of wearable device 100 may also provide a geographic location of wearable device 100, for example, using global positioning signals from one or all of the integrated communications devices.

A unique device identifier of wearable device 100 and user information of one or more users associated with wearable device 100 may be registered with one or more affiliated emergency providers (step 700). An authorized wearable device 100 may execute a request for emergency assistance via active or passive user input via wearable device 100 (step 702).

In some cases, emergency request verification may be used (step 704). When emergency request verification is not used, step 704 proceeds to step 708. When emergency request verification is used, step 704 proceeds to step 706, and the user of wearable device 100 verifies the emergency response request via user input to wearable device 100 (e.g., a button press, a gesture and/or a voice command) (step 706).

The request may be communicated to an appropriate emergency response provider, for example, directly through communication transponder 110 or via a connected communications device (e.g., connected device 102) (step 708). The nature of the emergency may be ascertained, for example, actively via user input through wearable device 100 or passively via biometric signal(s) from sensor(s) 120 or remote activation of a microphone (e.g., user interface 122) of wearable device 100. In some examples, a geolocation of wearable device 100 (worn by the user) may be determined and communicated to the responder(s) via on-board communication transponder 110. The emergency response may then be executed (step 710).

Because of the many types of communication standards that may be included in wearable device 100, and the ability to continually update wearable device 100 to any suitable new communication standard, it is understood that the operation modes described herein represent non-limiting examples of operation modes of wearable device 100. Accordingly, it is contemplated that wearable device 100 may be configured for other types of interactions with one or more compatible electronic devices, in addition to the example operation modes described herein.

Figure 8:
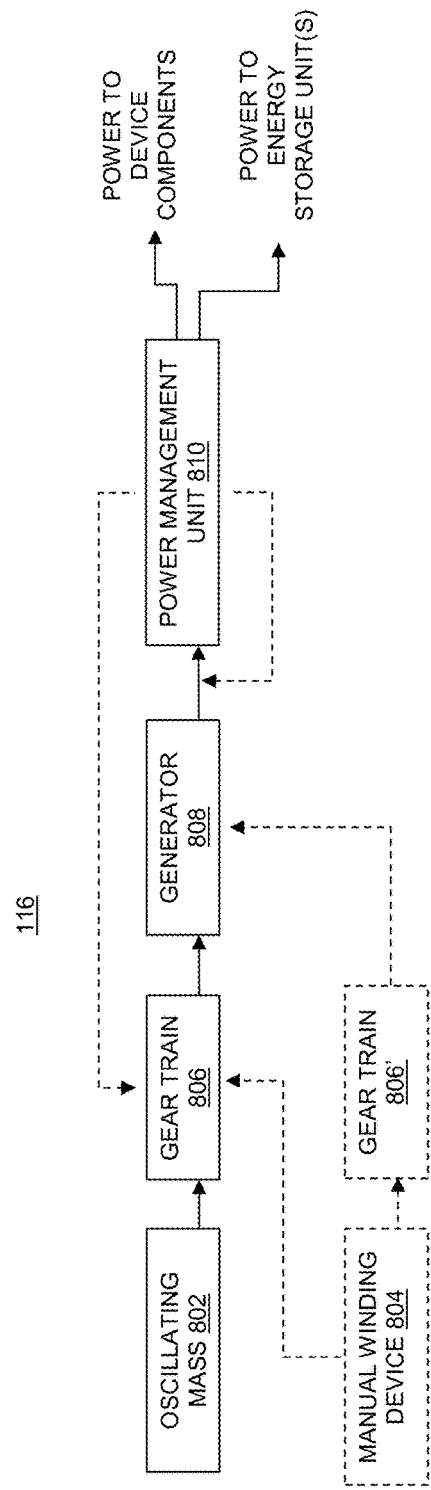
FIG. 8 is a functional block diagram of an example kinetic energy system shown in FIG. 1, according to an aspect of the present disclosure.
Figure 9C:
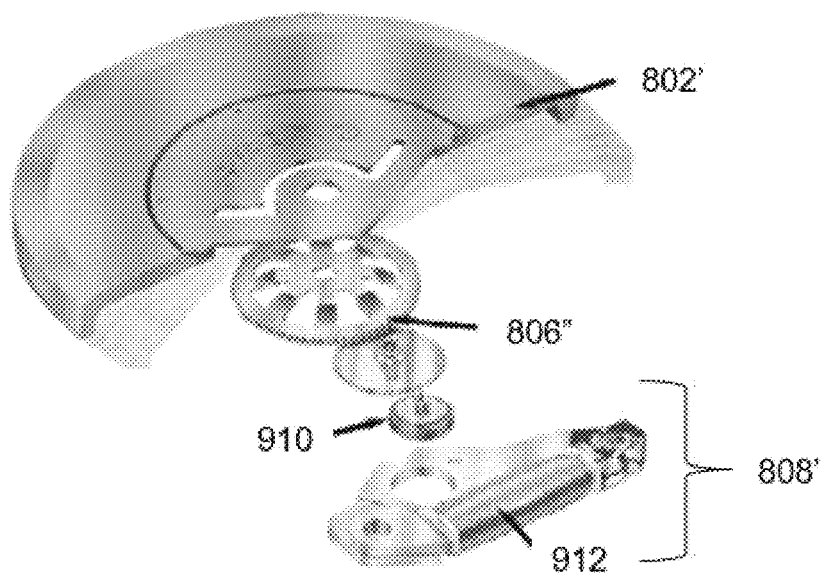
FIG. 9C is an exploded perspective view diagram of a portion of the kinetic energy system shown in FIG. 8, according to another aspect of the present disclosure

Referring to FIGS. 8 and 9A-9C, an exemplary kinetic energy system 116 is described. In particular, FIG. 8 is a functional block diagram illustrating example kinetic energy system 116; FIG. 9A is an exploded perspective view diagram of a portion of kinetic energy system 116; FIG. 9B is an exploded perspective view diagram of generator 808 shown in FIG. 9A; and FIG. 9C is an exploded perspective view diagram of a portion of kinetic energy system 116 according to another aspect of the present disclosure. Kinetic energy system 116 may include oscillating mass 802, gear train 806, generator 808 and power management unit 810.

Kinetic energy system 116 may be configured to harness natural motion of the wearer of wearable device 100 into a rotating mass (via oscillating mass 802). The rotational energy of oscillating mass 802 may be transferred, via gear train 806, to generator 808 for conversion to electrical energy. The electrical output of generator 808 may be distributed, via power management unit 810, to directly power one or more components of wearable device 100 (having wireless communication functions) and/or to recharge energy storage unit(s) 112 (that in turn powers wearable device 100).

In some examples, kinetic energy system 116 may optionally include manual winding device 804. In some examples, manual winding device 804 may be mechanically coupled to gear train 806. In other examples, manual winding device 804 may be mechanically coupled to separate gear train 806'. Manual winding device 804 (e.g., a winding crown) may be manually operated by a wearable device user to rotate gear train 806 (806'), to subsequently drive generator 808 and generate electrical energy.

Oscillating mass 802 may collect the natural motion of a user of wearable device 100 (e.g., motion of the user's arm) and convert the collected motion to rotational energy (i e, kinetic energy). In operation, movement of the wearer causes oscillating mass 802 to revolve (illustrated by double headed arrow A in FIG. 9A) and produce rotational energy. Oscillating mass 802 may be composed of a dense metal (such as, without being limited to, gold, tungsten or platinum) to harness a suitable amount of kinetic force to drive gear train 806.

Gear train 806 may be configured to receive rotational energy from oscillating mass 802 (and, in some examples, manual winding device 804) and transfer (transmit) the rotational energy to generator 808. Gear train 806 may include one or more mechanical gears configured to amplify the speed of rotation of the received rotational energy by a predetermined amount (e.g., 100 times). A combination of mechanical gears may be selected to provide a gear ratio that results in a maximum transfer of rotational energy between oscillating mass 802 (and, in some examples, optional manual winding device 804) to generator 808. Gear train 806' may be similar to gear train 806 but may have a different gear ratio better suited to manual winding device 804.

Referring to FIGS. 8, 9A and 9B, generator 808 may be configured to receive rotational energy from gear train 806 (and, in some cases optional gear train 806') and convert the rotational energy to electrical energy. Generator 808 may include an electromagnetic generator. For example, generator 808 may include pinion 902, magnet 906, coil 908 having plural windings and stator 910. Pinion 902 may be mechanically coupled to gear train 806. Pinion 902 and magnet 906 may be mechanically coupled together via shaft 904. Magnet 906 and stator 910 may enclose coil 908. Pinion 902 may be configured to spin on shaft 904 responsive to the received rotational energy, causing magnet 906 to rotate and generate a magnetic charge. Rotation of magnet 906 in stator 910 may transform the magnetic charge into electrical energy. Although FIGS. 8, 9A and 9C illustrate a single generator 808, kinetic energy system 116 may include one or more generators 808. The electrical energy output of one or more generators 808 may be used to power one or more components of wearable device 100 and/or to store the electrical energy among energy storage unit(s) 112. By way of example and without limiting options for additional generator technologies or modules, generator 808 may include a micro generator system model number 26.4 manufactured by Kinetron (Tilburg, The Netherlands).

According to another example, kinetic energy system 116 may oscillating mass 802', gear train 806" and generator 808' shown in FIG. 9C. Oscillating mass 802' and gear train 806" are similar to oscillating mass 802 and gear train 806 shown in FIG. 9A, except for the arrangement of gear train 806" relative to oscillating mass 802' and generator 808'. Generator 808' may be an electromagnetic generator, similar to generator 808 shown in FIG. 9A. Generator 808' may include micro-rotator 910 and coil block 912. Micro-rotator 910 may be configured to spin responsive to the received rotational energy, and generate a magnetic charge. Coil block 912 may be configured to transform the magnetic charge from micro-rotator 902 into electrical energy.

Referring back to FIG. 8, power management unit 810 may be configured to receive the electrical energy from generator 808 and distribute the electrical energy among energy storage unit(s) 112 and one or more components of wearable device 100. Power management unit 810 may distribute the electrical energy based on at least one of a charge state of each energy storage unit 112, a predetermined operation mode of wearable device 100, an operating state (i.e., standby mode or communication mode) of wearable device 100 and predetermined energy requirements for components of wearable device 100.

When a user of wearable device 100 is in motion, it may provide a constant stream of electricity to wearable device 100. If this electrical energy is routed to energy storage unit(s) 112, the number of charging cycles may affect the reliability of energy storage unit(s) 112. Thus, power management unit 810 may distribute the electrical energy from generator 808 in a predetermined manner to provide appropriate charge protection, discharge protection and appropriate regulation of electrical energy to components of wearable device 100 for a predetermined operation mode and operating state.

Power management unit 810 may monitor the current charge state of each energy storage unit 112. When power management unit 810 determines that one or more of energy storage units 112 have reached a maximum charge state, power management unit 810 may reroute electrical energy to another one of energy storage units 112, or may deactivate collection of electrical energy by power management unit 810 from the kinetic energy (if all of energy storage units 112 have reached a maximum charge state). For example, power management unit 810 may disengage gear train 806 (such that generator 808 is not actuated by gear train 806, for example by a mechanical switch) or may decouple generator 808 from power management unit 810 (e.g., by a mechanical switch). Power management unit 810 is described further below with respect to FIG. 10.

FIG. 10 is a functional block diagram of example power management unit 810. Power management unit 810 may include rectifier 1002, charge state detector 1004, charge/discharge protector 1006 and power output regulator 1008. Power management unit 810 may monitor the current charge state of each energy storage unit 112 and distribute electrical energy among energy storage unit(s) 112 and one or more components of wearable device 100. By monitoring the current charge state of energy storage unit(s) 112 as well as distributing electrical energy, power management unit 810 may increase both the reliability of wearable device 100 and a usable lifetime of energy storage unit(s) 112, as well as preventing overcharging of energy storage unit(s) 112. Although not shown, power management unit 810 may include a controller, such as a microprocessor, to control operation of one or more of rectifier 1002, charge state detector 1004, charge/discharge protector 1006 and power output regulator 1008.

FIG. 10 illustrates an example of wearable device 100 having plural energy storage units 112. In this example, energy storage units 112 including at least one primary energy storage unit 1012 (e.g., at least one battery) and at least one secondary energy storage unit 1014 (e.g., at least one capacitor and/or supercapacitor). Primary energy storage unit(s) 1012 and secondary energy storage unit(s) 1014 may be useful for different operating states, described further below.

Power management unit 810 may include rectifier 1002 configured to receive electrical energy from generator 808 and to transform the received electrical energy into a rectified (i.e., normalized) output.

Power management unit 810 may include charge state detector 1004 configured to receive the rectified electrical energy and to measure a current charge state of each energy storage unit 112, such as primary energy storage unit(s) 1012 and secondary energy storage unit(s) 1014. Charge state detector 1004 may provide the charge state to power output regulator 1008 and to charge/discharge protector 1006.

Charge/discharge protector 1006 may receive the current charge state from charge state detector of each energy storage unit 112 and may manage the flow (distribution) of electrical energy to each energy storage unit 112 depending upon whether each energy storage unit 112 can accept additional charge. When an energy storage unit 112 reaches a predetermined maximum charge state (e.g., primary energy storage unit 1012), the particular energy storage unit 112 (e.g., primary energy storage unit 1012) is prevented from receiving additional electrical energy. Protector 1006 may reroute the electrical energy to another energy storage unit 112 (e.g., secondary energy storage unit 1014) or may prevent all energy storage units 112 from receiving additional electrical energy. Thus, protector 1006 may completely isolate energy storage unit(s) 112 from the kinetic energy output.

Protector 1006 may continue to isolate energy storage unit(s) 112 from the kinetic energy output until the current charge state of one or more of energy storage unit(s) 112 drops below a predetermined threshold (less than the corresponding maximum charge state). Once protector 1006 determines that the current charge state of one or more of energy storage unit(s) 112 is below the predetermined threshold, protector 1006 may reactive routing of electrical energy from the kinetic energy output to energy storage unit(s) 112.

Power output regulator 1008 may route the rectified electrical energy from rectifier 1002 and/or stored electrical energy from among energy storage unit(s) 112 (e.g., among primary energy storage unit(s) 1012 and secondary energy storage unit(s) 1014) and distributes the electrical energy among energy storage unit(s) 112 and one or more components of wearable device 100, depending upon the charge state (from charge state detector 1004), a predetermined operation mode of wearable device 100, predetermined energy specifications for the respective components, and/or a current operating state of wearable device 100.

Energy requirements for wearable device 100 may vary depending upon the current operating state (i.e., a standby mode or a communication mode). A communication mode may use larger bursts of electrical energy compared to a standby mode. In some examples, power output regulator 1008 may distribute electrical energy from secondary energy storage unit(s) 1014 (e.g., capacitor(s) and/or supercapacitor(s)) during a communication mode and may distribute electrical energy from primary energy storage unit(s) 1012 (e.g., at least one battery) during a standby mode.

Accordingly, power management unit 810 may detect incoming electrical energy from generator 808 and regulate electrical energy (i.e., voltage and current) among components of wearable device 100 and energy storage unit(s) 112. Power management unit 810 may also prevent overcharging by detecting the charge state of each energy storage unit(s) 112 and distributing electrical energy to an energy storage unit 112 that is not fully charged. If all energy storage unit(s) 112 are fully charged, power management unit 810 may switch off the electrical input to power management unit 810 (or deactivate gear train 806) until a predetermined charge state (i.e., a predetermined threshold) is reached, thereby reactivating the flow of electrical energy from generator 808. Different energy storage unit(s) 112 may have different properties. For example, some of energy storage unit(s) 112 may be capable of withstanding more charging cycles than others of energy storage units 112, while still other energy storage unit(s) 112 may have a predetermined range of charge state for lifecycle longevity. Accordingly, the more efficiently power management unit 810 may charge energy storage unit(s) 112, the longer energy storage unit(s) 112 may remain operational.

Figure 11:
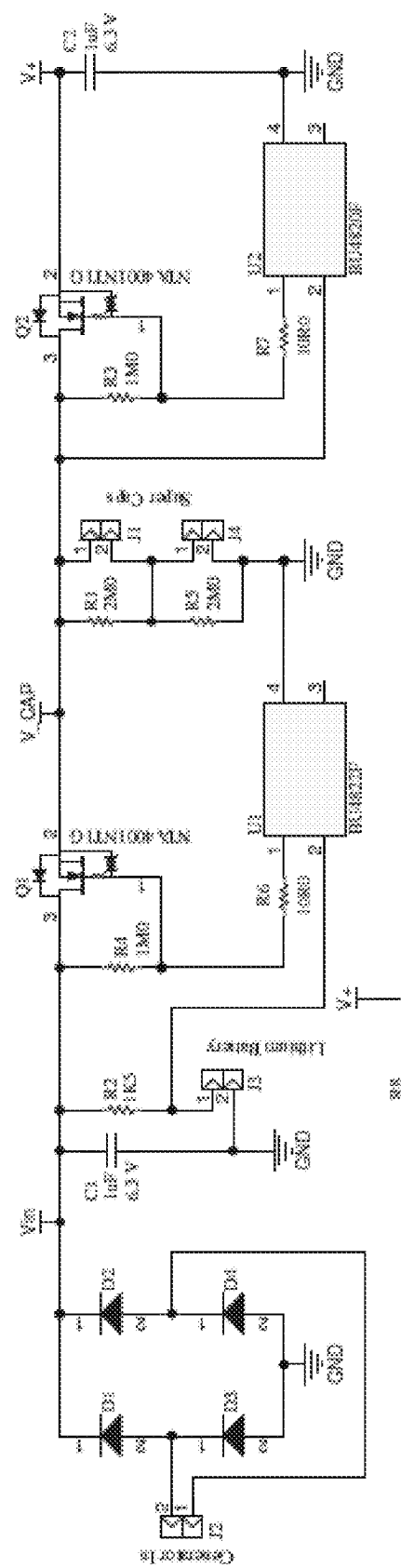
FIG. 11 is a circuit diagram of an example power management unit, according to an aspect of the present disclosure.

FIG. 11 illustrates a circuit diagram of an example power management unit 810. It is understood that FIG. 11 represents a non-limiting example, and that power management unit 810 may include any suitable hardware and/or software components to perform the functions described herein.

Figure 12:
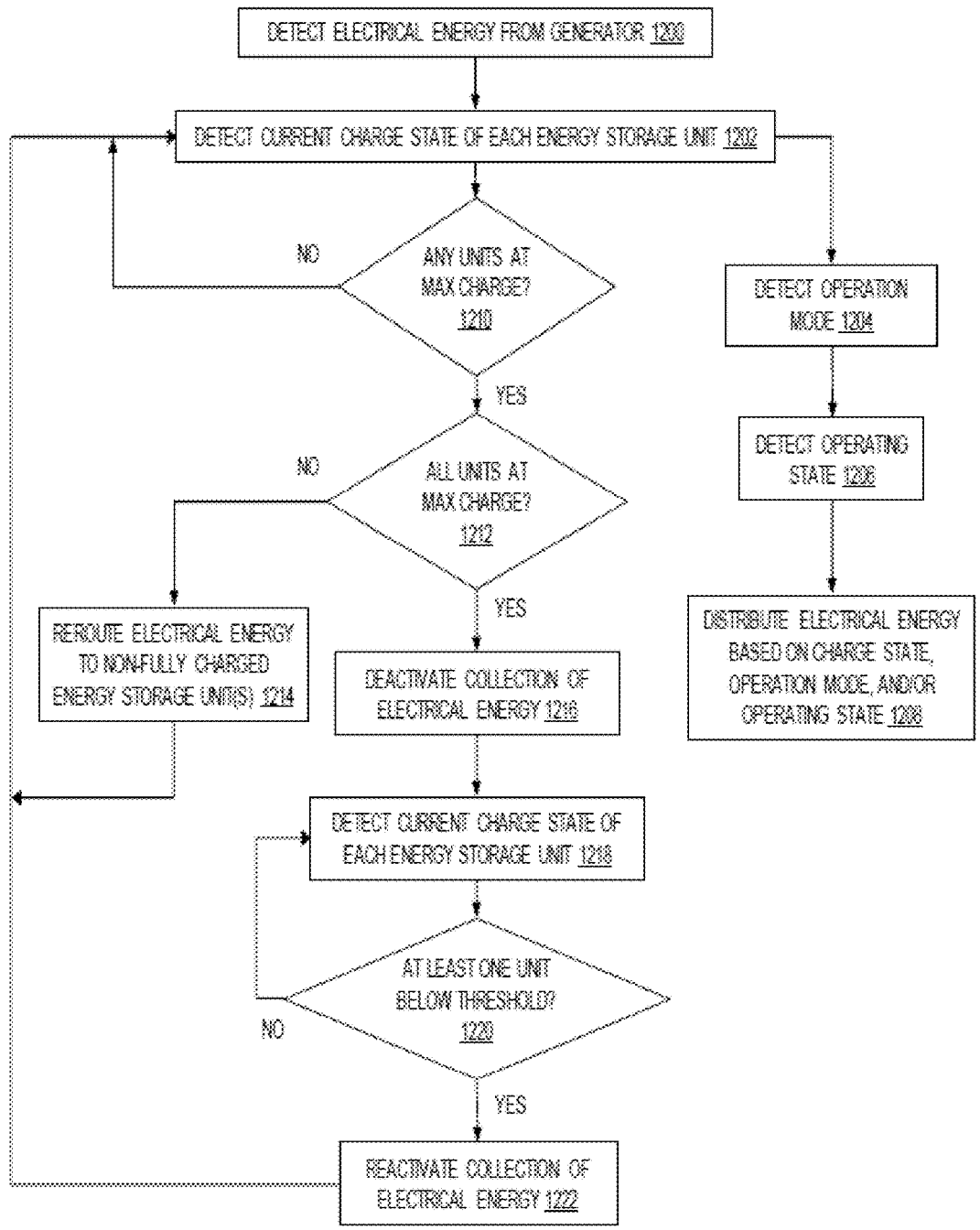
FIG. 12 is a flowchart diagram of an example method of powering a wearable electronic device, according to an aspect of the present disclosure.

FIG. 12 is a flowchart diagram of an example method of distributing power among one or more components of wearable device 100 and energy storage unit(s) 112. At step 1200, power management unit 810 may detect electrical energy received from generator 808. At step 1202, charge state detector 1004 may detect a current charge state for each energy storage unit 112 (e.g., each primary unit 1012 and each secondary unit 1014).

At step 1204, power output regulator 1008 may detect a current operation mode of wearable device 100, for example, via processor 106. At step 1206, power output regulator 1008 may detect a current operating state of wearable device 100. For example, power output regulator 1008 may detect whether wearable device is currently in a standby mode or a communication mode, for example, via processor 106 and/or based on an operating state of communication transponder 110. At step 1208, power output regulator 1008 may distribute the detected electrical energy from generator 808 among energy storage unit(s) 112 and one or more components of wearable device 100, based on one or more of the detected current charge state, the detected operation mode and the detected operating state. Power output regulator 1008 may also distribute the electrical energy to the component(s) based on respective predetermined energy requirements of the component(s).

Step 1202 may also proceed to step 1210. At step 1210, charge/discharge protector 1006 may determine whether any of energy storage unit(s) 112 have reached an associated maximum charge state. If charge/discharge protector 1006 determines that none of energy storage unit(s) 112 have reached a maximum charge state, step 1210 proceeds to step 1202.

If charge/discharge protector 1006 determines that at least one of energy storage unit(s) 112 has reached a maximum charge state, step 1210 proceeds to step 1212. At step 1212, charge/discharge protector 1006 may determine whether all of energy storage unit(s) 112 have reached their associated maximum charge states. If charge/discharge protector 1006 determines that fewer than all of energy storage unit(s) 112 have reached the maximum charge state, step 1212 proceeds to step 1214.

At step 1214, charge/discharge protector 1006 may reroute electrical energy from a fully charged energy storage unit 112 to at least one less than fully charged energy storage unit 112. For example, if primary unit 1012 has reached a maximum charge state, charge/discharge protector 1006 may route at least a portion of the detected electrical energy (e.g., after distribution by power output regulator 1008 in step 1208) to at least one secondary unit 1014. Step 1214 may proceed to step 1202.

If charge/discharge protector 1006 determines that all energy storage unit(s) 112 have reached their respective maximum charge states, step 1212 proceeds to step 1216. At step 1216, charge/discharge protector 1006 may deactivate collection of electrical energy from the kinetic energy, to completely isolate all energy storage unit(s) 112 from the kinetic energy output. For example, charge/discharge protector 1006 may disengage gear train 806 or may electrically decouple generator 808 from power management unit 810.

At step 1218, charge state detector 1004 may detect a current charge state of each energy storage unit 1218. At step 1220, charge/discharge protector 1006 may determine whether at least one of energy storage unit(s) 112 has reduced its charge state such that the current charge state is below a predetermined threshold (less than the maximum charge state). If charge/discharge protector 1006 determines that none of energy storage unit(s) 112 have a charge state less than the threshold, step 1220 proceeds to step 1218.

If charge/discharge protector 1006 determines that at least one of energy storage unit(s) 112 have a charge state less than the threshold, step 1220 may proceeds to step 1222. At step 1222, charge/discharge protector 1006 may reactivate collection of electrical energy from the kinetic energy. For example, charge/discharge protector 1006 may re-engage gear train 806 or may electrically re-couple generator 808 to power management unit 810. Step 1222 may proceed to step 1202.

It may be appreciated that steps 1204-1208, in some examples, may be performed simultaneously with steps 1210-1222. Thus, power management unit 810 may simultaneously distribute electrical energy among energy storage units and component(s) 112 of wearable device 100 while also preventing overcharging of energy storage unit(s) 112.

Systems and methods of the present disclosure include and/or may be implemented by one or more computers including hardware and/or software components. For purposes of this disclosure, a computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

The invention claimed is:

1. A wearable electronic device comprising:
a communication transponder configured to wirelessly communicate with a further electronic device over a communication channel;
a processor electrically coupled to a non-transitory memory, the processor executing computer-readable instructions stored in the non-transitory memory, the processor configured to control the communication transponder such that information is passed between the wearable electronic device and the further electronic device over the communication channel according to a predetermined operation mode, the predetermined operation mode involving interaction of the wearable electronic device and the further electronic device;
at least one energy storage unit; and
a kinetic energy system, electrically coupled to the at least one energy storage unit, the kinetic energy system configured to:
convert kinetic energy collected from motion of the wearable electronic device to electrical energy, and
distribute the electrical energy among the at least one energy storage unit and one or more other electrical components of the wearable electronic device based on a charge state of the at least one energy storage unit and the predetermined operation mode of the wearable electronic device.

2. The device of claim 1, wherein the kinetic energy system is further configured to distribute the electrical energy among the at least one energy storage unit and the one or more other electrical components based on a current operating state of the wearable electronic device in one of a standby mode and a communication mode.

3. The device of claim 2, wherein the kinetic energy system is configured to route at least one of the electrical energy currently converted from the kinetic energy and previously stored electrical energy from among the at least one energy storage unit to the one or more other electrical components according to at least one of the predetermined operation mode, the current operating state and predetermined energy specifications for each of the one or more other electrical components.

4. The device of claim 1, wherein the at least one energy storage unit includes a primary energy storage unit and at least one secondary energy storage unit.

5. The device of claim 4, wherein the primary energy storage unit includes a battery and the at least one secondary energy storage unit includes at least one of a capacitor and a supercapacitor.

6. The device of claim 4, wherein the kinetic energy system detects a current charge state of each of the primary energy storage unit and the at least one secondary energy storage unit, and distributes the electrical energy among the primary energy storage unit and the at least one secondary energy storage unit according to each detected current charge state.

7. The device of claim 1, wherein the kinetic energy system includes:
an oscillating mass configured to convert the collected motion to the kinetic energy;
an electromagnetic generator configured to convert the kinetic energy to the electrical energy; and
a power management unit configured to detect the electrical energy from the electromagnetic generator and to distribute the detected electrical energy among the at least one energy storage unit and the one or more other electrical components.

8. The device of claim 7, where the kinetic energy system further includes a gear train mechanically coupled to the oscillating mass and the electromagnetic generator, the gear train configured to transmit rotation movement of the oscillating mass to the electromagnetic generator.

9. The device of claim 8, wherein the power management unit is configured to:
determine whether the charge state of the at least one energy storage unit is equal to a maximum charge state, and
at least one of disengage the gear train and decouple the electromagnetic generator from the power management unit, when the charge state is equal to the maximum charge state.

10. The device of claim 7, further comprising a manual winding device mechanically coupled to the electromagnetic generator via a gear train, the gear train configured to transmit rotation movement of the manual winding device to the electromagnetic generator.

11. The device of claim 1, wherein the further electronic device includes at least one of a mobile phone, a tablet computer, a personal computer, a payment terminal, an access terminal and a security system.

12. The device of claim 1, further comprising one or more of at least one sensor, an output indicator and a user interface.

13. The device of claim 12, wherein the at least one sensor includes at least one of a fingerprint sensor, a heart rate sensor, a voice sensor and a motion sensor.

14. The device of claim 1, wherein the predetermined operation mode includes at least one of an identity verification mode, a digital wallet transaction mode, a secure access mode, a biometric tracking mode, a control mode for controlling the further electronic device, a communication mode and an emergency response mode.

15. A method for powering a wearable electronic device, the method comprising:
- operating, by a processor, the wearable device in a predetermined operation mode involving interaction of the wearable electronic device and a further electronic device, wherein, during the predetermined operation mode, information is passed between the wearable electronic device and the further electronic device according to the predetermined operation mode, via a communication transponder configured to wirelessly communicate with the further electronic device over a communication channel, the processor executing computer-readable instructions stored in a non-transitory memory;
- converting, by a kinetic energy system, kinetic energy collected from motion of the wearable electronic device to electrical energy;
- detecting, by the kinetic energy system, a charge state of at least one energy storage unit of the wearable electronic device; and
- distributing, by the kinetic energy system, the electrical energy among the at least one energy storage unit and one or more other electrical components of the wearable electronic device based on the detected charge state of the at least one energy storage unit and the predetermined operation mode of the wearable electronic device.

16. The method of claim 15, wherein the distributing of the electrical energy further includes distribute the electrical energy among the at least one energy storage unit and the one or more other electrical components based on a current operating state of the wearable electronic device in one of a standby mode and a communication mode.

17. The method of claim 16, wherein the distributing of the electrical energy includes routing at least one of the electrical energy currently converted from the kinetic energy and previously stored electrical energy from among the at least one energy storage unit to the one or more other electrical components according to at least one of the predetermined operation mode, the current operating state and predetermined energy specifications for each of the one or more other electrical components.

18. The method of claim 15, wherein the at least one energy storage unit includes a primary energy storage unit and at least one secondary energy storage unit, and the detecting of the charge state further includes:
- detecting a current charge state of each of the primary energy storage unit and the at least one secondary energy storage unit, and
- distributing the electrical energy among the primary energy storage unit and the at least one secondary energy storage unit according to each detected current charge state.

19. The method of claim 15, wherein the detecting of the charge state includes:
- determining whether the charge state of the at least one energy storage unit is equal to a maximum charge state, and
- deactivating distribution of the electrical energy from the converted kinetic energy, when the charge state is equal to the maximum charge state.

20. The method of claim 19, the method further including:
- determining whether the current charge state of the at least one energy storage unit is less than the maximum charge state by a predetermined value; and
- reactivating distribution of the electrical energy from the converted kinetic energy, when the current charge state is less than the maximum charge state by the predetermined value.

* * * * *